(12) United States Patent
Nishii et al.

(10) Patent No.: US 8,563,194 B2
(45) Date of Patent: Oct. 22, 2013

(54) ELECTROLYTE MEMBRANE FOR POLYMER ELECTROLYTE FUEL CELL AND METHOD OF MANUFACTURING THE SAME

(75) Inventors: Hiroyuki Nishii, Osaka (JP); Tooru Sugitani, Osaka (JP); Otoo Yamada, Osaka (JP); Sakura Toshikawa, Osaka (JP)

(73) Assignee: Nitto Denko Corporation, Osaka (JP)

( * ) Notice: Subject to any disclaimer, the term of this patent is extended or adjusted under 35 U.S.C. 154(b) by 315 days.

(21) Appl. No.: 12/988,572

(22) PCT Filed: Apr. 22, 2009

(86) PCT No.: PCT/JP2009/057999
§ 371 (c)(1),
(2), (4) Date: Oct. 19, 2010

(87) PCT Pub. No.: WO2009/136546
PCT Pub. Date: Nov. 12, 2009

(65) Prior Publication Data
US 2011/0039185 A1    Feb. 17, 2011

(30) Foreign Application Priority Data
May 8, 2008    (JP) .................................. 2008-122759

(51) Int. Cl.
*H01M 8/10* (2006.01)
*B05D 5/12* (2006.01)

(52) U.S. Cl.
USPC ............ 429/493; 429/491; 429/492; 427/492

(58) Field of Classification Search
USPC ........................... 429/491, 492, 493; 427/492
See application file for complete search history.

(56) References Cited

U.S. PATENT DOCUMENTS

| | | | |
|---|---|---|---|
| 4,877,529 A * | 10/1989 | Pasternak et al. | ........ 210/500.37 |
| 5,409,785 A | 4/1995 | Nakano et al. | |
| 5,438,082 A | 8/1995 | Helmer-Metzmann et al. | |
| 6,087,031 A | 7/2000 | Iwasaki et al. | |
| 6,245,881 B1 | 6/2001 | Faure et al. | |
| 6,523,699 B1 * | 2/2003 | Akita et al. | .................... 210/490 |
| 7,700,211 B2 | 4/2010 | Nakamura et al. | |
| 2006/0003195 A1 | 1/2006 | Noh | |
| 2006/0105216 A1 | 5/2006 | Nagai et al. | |
| 2006/0177606 A1 * | 8/2006 | Lo et al. | ....................... 428/1.31 |
| 2008/0275146 A1 * | 11/2008 | McGrath et al. | ................ 521/27 |

FOREIGN PATENT DOCUMENTS

| | | |
|---|---|---|
| JP | 9-245818 | 9/1997 |
| JP | 2005-353581 | 12/2005 |
| JP | 2006-31970 | 2/2006 |
| JP | 2007-213936 | 8/2007 |
| JP | 2007-311239 | 11/2007 |

OTHER PUBLICATIONS

Wang et al., "Novel multilayer Nafion/SP1/Nafion composite membrane for PEMFCs," Journal of Power Sources, vol. 164, pp. 80-85, 2007.

Watari et al., "Synthesis, water stability and proton conductivity of novel sulfonated polyimides from 4,4'-bis (4-aminophenoxy) biphenyl-3,3'-disulfonic acid," Journal of Membrane Science, vol. 230, pp. 111-120, 2004.

* cited by examiner

*Primary Examiner* — Patrick Ryan
*Assistant Examiner* — Ladan Mohaddes
(74) *Attorney, Agent, or Firm* — Hamre, Schumann, Mueller & Larson, P.C.

(57) ABSTRACT

An electrolyte membrane (1) includes a base material layer (1) containing a hydrocarbon-based electrolyte as a main component, and a surface layer (5) laminated with the base material layer (1). The surface layer (5) is a layer containing, as a main component, a polymeric material having a hydroxyl group and a proton conductive group. The polymeric material that constitutes the surface layer (5) contains, for example, a first polymer having a hydroxyl group, and a second polymer having a proton conductive group. A matrix is formed by cross-linking the first polymer, and the second polymer can be held in the matrix.

11 Claims, 1 Drawing Sheet

ELECTROLYTE MEMBRANE FOR POLYMER ELECTROLYTE FUEL CELL AND METHOD OF MANUFACTURING THE SAME

TECHNICAL FIELD

The present invention relates to an electrolyte membrane for a polymer electrolyte fuel cell and a method of manufacturing the membrane.

BACKGROUND ART

In recent years, fuel cells have been attracting attention as a next generation energy source. In particular, polymer electrolyte fuel cells (PEFCs) using a proton conducting polymer membrane as the electrolyte have high energy density, and are expected to find a wide range of applications, such as in home cogeneration systems, power sources for mobile devices, and power sources for automobiles. The electrolyte membrane of a PEFC is required to serve not only as an electrolyte for conducting protons between the fuel electrode and the oxidant electrode but also as a partition between a fuel supplied to the fuel electrode and an oxidant supplied to the oxidant electrode. If these functions as the electrolyte and the partition are insufficient, the power generation efficiency of the fuel cell decreases. For this reason, polymer electrolyte membranes are required to have high proton conductivity, electrochemical stability, and mechanical strength, and low permeability to fuels and oxidants.

Currently, perfluorocarbon sulfonic acid having a sulfonic acid group as a proton conductive group (for example, Nafion (registered trademark) manufactured by DuPont) is widely used for electrolyte membranes in PEFCs. Although perfluorocarbon sulfonic acid membranes exhibit excellent electrochemical stability, they are very expensive because fluororesin as a source material is not a general-purpose product and also its synthesis process is complicated. A high cost of such electrolyte membranes is a major obstacle in the practical application of PEFCs. Moreover, perfluorocarbon sulfonic acid membranes allow methanol to permeate easily, so it is difficult to use such a perfluorocarbon sulfonic acid membrane as the electrolyte membrane for a direct methanol fuel cell (DMFC) in which a methanol-containing solution is supplied to the fuel electrode.

Accordingly, as an alternative to such perfluorocarbon sulfonic acid membranes, inexpensive hydrocarbon-based electrolyte membranes with reduced methanol crossover have been developed. For example, Patent Literatures 1 to 4 propose electrolyte membranes made of sulfonated poly(ether ether ketone), sulfonated poly(ether sulfone), sulfonated polysulfone, and sulfonated polyimide, respectively. The resins used as the source materials of these hydrocarbon-based electrolyte membranes are less expensive than fluororesin, so the use of these electrolyte membranes can reduce the cost of PEFCs. However, the performance of the hydrocarbon-based electrolyte membranes proposed in Patent Literatures 1 to 4 is not necessarily high enough, and PEFCs using hydrocarbon-based electrolyte membranes have not yet been put into practical use.

CITATION LIST

Patent Literature

Patent Literature 1 JP 06 (1994)-93114 A
Patent Literature 2 JP 10 (1998)-45913 A
Patent Literature 3 JP 09 (1997)-245818 A
Patent Literature 4 JP 2000-510511 T

Non Patent Literature

Non Patent Literature 1 L. Wang, et al., Journal of Power Source 164 (2007)
Non Patent Literature 2 Okamoto, et al., J. Memb. Sci., 2004, 230, 111

SUMMARY OF INVENTION

Technical Problem

There are various reasons that hinders the practical application of hydrocarbon-based electrolyte membranes, but it has been often pointed out that one of the reasons is poor contact between a hydrocarbon-based electrolyte membrane and electrodes. Such poor contact makes it difficult to reduce the contact resistance and to increase the power generation efficiency.

Hot pressing, in which the surface of an electrolyte membrane is melted by heat to join the electrolyte membrane and electrodes, is an effective way to improve the contact between the electrolyte membrane and the electrodes. It is, however, difficult to apply hot pressing to a hydrocarbon-based electrolyte membrane containing a thermosetting resin like polyimide as a main component. Alternatively, an anode, an electrolyte membrane, and a cathode may be sandwiched and pressed tightly between separators, but this method cannot reduce the contact resistance sufficiently.

Non Patent Literature 1 discloses an application of Nafion onto an electrolyte membrane as another way to improve the contact between an electrolyte membrane and electrodes. For example, a sulfonated polyimide membrane is immersed in a Nafion dispersion and then dried. As a result, a Nafion layer is formed on the sulfonated polyimide membrane. The sulfonated polyimide membrane having the Nafion layer formed thereon is joined with the electrodes by hot pressing. Nevertheless, from the viewpoints of cost and environmental impact, it is better to avoid or reduce the use of fluororesin, if possible.

Under these circumstances, it is an object of the present invention to provide a hydrocarbon-based electrolyte membrane with improved contact with electrodes.

Solution to Problem

The present invention provides an electrolyte membrane for a polymer electrolyte fuel cell. This electrolyte membrane includes: a base material layer containing a hydrocarbon-based electrolyte as a main component; and a surface layer laminated with the base material layer and containing, as a main component, a polymeric material having a hydroxyl group and a proton conductive group.

In another aspect, the present invention provides a membrane-electrode assembly, including: an electrolyte membrane of the present invention; and a pair of electrodes placed to sandwich the electrolyte membrane therebetween.

In still another aspect, the present invention provides a fuel cell having a membrane-electrode assembly of the present invention as a power generating component.

In further still another aspect, the present invention provides a method of manufacturing an electrolyte membrane for a polymer electrolyte fuel cell. This method includes the steps of preparing a base material containing a hydrocarbon-based electrolyte as a main component; preparing a solution containing: a first polymer having a hydroxyl group; and a second polymer having a proton conductive group; and forming a surface layer on the base material using the solution. This surface layer contains, as a main component, a polymeric material in which the second polymer is held in a matrix that is formed by cross-linking the first polymer.

Advantageous Effects of Invention

The electrolyte membrane of the present invention has a base material layer and a surface layer laminated with the base material layer. The surface layer has a hydroxyl group and a proton conductive group. It is believed that the hydroxyl group increases the softness of the surface layer when the electrolyte membrane is moisturized with water. Therefore, in the electrolyte of the present invention, the surface layer improves the contact with the electrodes while the base material layer ensures the properties such as mechanical strength and gas blocking. Furthermore, the multiple layer structure allows independent adjustment of the properties of the respective layers, which provides a higher degree of design flexibility than the single layer structure.

The electrolyte membrane of the present invention has improved contact with electrodes compared to conventional hydrocarbon-based electrolyte membranes. Therefore, the use of the electrolyte membrane of the present invention in an MEA of a fuel cell can reduce the time required to activate ("age") the catalyst and the electrolyte or increase the power generation efficiency.

DESCRIPTION OF EMBODIMENT

Hereafter, one embodiment of the present invention will be described. In the present description, a "main component" means a component whose content is the highest in weight percent.

Figure 1:
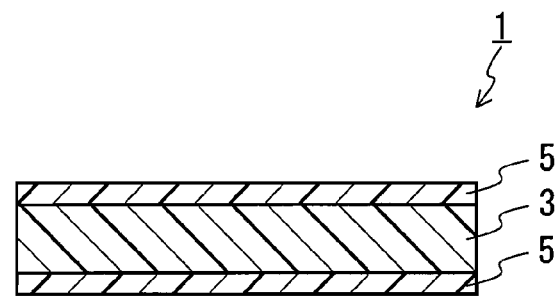
FIG. 1 is a schematic view illustrating one example of an electrolyte membrane according to the present invention.

FIG. 1 is a schematic view of a hydrocarbon-based electrolyte membrane according to the present embodiment. An electrolyte membrane 1 has a base material layer 3 and surface layers 5. The surface layers 5 are each a layer laminated with the base material layer 3, and cover the surfaces of the base material layer 3. The surfaces of the electrolyte membrane 1 are formed by the surface layers 5.

In the present embodiment, the surface layer 5 is formed on the upper surface of the base material layer 3 and the surface layer 5 is formed on the lower surface of the base material layer 3 so that the surface layers 5 sandwich the base material layer 3 therebetween. With such a structure, the contact with both the anode and the cathode can be improved. The surface layer 5 may be formed on only one of the surfaces of the base material layer 3. Furthermore, the base material layer 3 may be entirely covered with the surface layer 5. That is, the lateral side of the base material layer 3 also may be covered with the surface layer 5.

<<Base Material Layer 3>>

The base material layer 3 is a layer containing a hydrocarbon-based electrolyte as a main component. The hydrocarbon-based electrolyte absorbs water and swells, and has water-insoluble or poorly water-soluble properties. Examples of such a hydrocarbon-based electrolyte include sulfonated polyimide and sulfonated polyarylene. Examples of the sulfonated polyarylene include sulfonated poly(ether ether ketone) and sulfonated poly(ether sulfone). These resins are less expensive and better methanol blocking properties than fluororesin.

Among these, sulfonated polyimide has a rigid molecular structure, and therefore has high thermal or mechanical durability. In addition, sulfonated polyimide changes its nature according to the type of acid anhydride or diamine used as a base monomer. Therefore, when sulfonated polyimide is used as a material for the base material layer 3, the nature of the base material layer 3 can be controlled relatively easily to conform to the properties required for the electrolyte membrane 1.

Generally, sulfonated polyimide is not melted by heat and has a low affinity for electrodes. Therefore, the contact between an electrolyte membrane made of sulfonated polyimide and electrodes is not good enough. It is also pointed out that an electrolyte membrane made of sulfonated polyimide is activated slowly. On the other hand, in the electrolyte membrane 1 of the present embodiment, the base material layer 3 is covered with the surface layers 5. Therefore, the contact between the electrolyte membrane 1 and the electrodes is improved significantly, compared to the sulfonated polyimide membrane alone. The surface layer 5 can be activated more rapidly than the sulfonated polyimide membrane (base material layer 3). The use of the electrolyte membrane 1 of the present embodiment in a fuel cell can reduce the time required for aging at the start of power generation or increase the power generation efficiency.

The thickness of the base material layer 3 is not particularly limited, and it may be in the range of 5 to 300 μm to ensure the strength of the electrolyte membrane 1.

<<Surface Layer 5>>

The surface layer 5 is a layer containing a polymeric material having a hydroxyl group and a proton conductive group other than a hydroxyl group. The proton conductive group is, for example, a sulfonic acid group or a phosphoric acid group, and it is typically a sulfonic acid group. The presence of a proton conductive group ensures the function of the polymeric material as an electrolyte.

The surface layer 5 is a layer having adequate water holding capacity. This adequate water holding capacity allows protons and water to move easily between the electrolyte membrane 1 and the electrodes. Furthermore, the presence of the surface layer 5 increases the softness of the surface of the electrolyte membrane 1. The soft surface of the electrolyte membrane 1 easily adapts itself to the irregularities of the electrode. As a result, the contact area between the electrolyte membrane 1 and the electrode increases, and the contact resistance therebetween decreases.

Specifically, the polymeric material that constitutes the surface layer 5 contains a first polymer having a hydroxyl group, and a second polymer having a proton conductive group. More specifically, the first polymer is cross-linked to form a matrix, and the second polymer is held in the matrix.

The first polymer is often water-soluble because it has a large number of hydroxyl groups. However, the first polymer can form a water-insoluble matrix when it is subjected to cross-linking treatment. Then, this matrix is made to hold the second polymer having a proton conductive group. As a result, the water-soluble second polymer can be used as a material for the surface layer 5. The use of the water-soluble second polymer provides the surface layer 5 with high water holding capacity and softness. In this surface layer 5, water has high mobility.

As the first polymer, for example, a vinyl resin can be used. Specific examples of the vinyl resin include a polyvinyl alcohol (PVA) and an ethylene-vinyl alcohol copolymer (EVOH). These can be used alone or in combination. Among these, a polyvinyl alcohol is used preferably. As well known, PVAs are water-soluble, but a cross-linked PVA is water-insoluble. It is preferable that the first polymer for forming the surface layer 5 be water-soluble because a manufacturing method to be described later can be used.

As the first polymer, a polysaccharide may be used. As the polysaccharide, at least one selected from the group consisting of chitin, chitosan, and cellulose can be used. As the first polymer, a mixture of a vinyl resin and a polysaccharide also can be used.

As the second polymer, a sulfonated polyarylene having water solubility can be used preferably. Examples of such a sulfonated polyarylene include sulfonated poly(ether ether ketone) and sulfonated poly(ether sulfone). The sulfonated polyarylene used for the surface layer 5 may be provided with the water-soluble properties by introducing many sulfonic acid groups.

Furthermore, as the second polymer, at least one selected from the group consisting of polystyrene sulfonic acid, polyvinyl sulfonic acid, poly-2-acrylamido-2-methylpropane sulfonic acid, water-soluble sulfonated poly(ether ether ketone), and water-soluble sulfonated poly(ether sulfone) also may be used. All of these have water-soluble properties. Like the first polymer, it is preferable that the second polymer be water-soluble because the manufacturing method to be described later can be used.

The magnitude relationship between the water holding capacity of the surface layer 5 and that of the base material layer 3 is not particularly limited. As a measure of the water holding capacity, a weight swelling ratio in water can be used. A higher weight swelling ratio in water means higher water holding capacity.

The weight swelling ratio in water is defined by the following equation:

$$(\text{weight swelling ratio in water}) = 100 \times \{(\text{swollen weight})/(\text{dry weight}) - 1\}$$

where the dry weight is the weight of a sample after it is allowed to stand in the atmosphere of 25° C. and 60 RH %, and the swollen weight is the weight of the sample after it is immersed in water at 25° C. to swell.

Specifically, the surface layer 5 preferably has a weight swelling ratio in water of 40 to 200%. Such a surface layer 5 has sufficient water holding capacity and high softness, and thus the effect of improving the contact between the electrolyte membrane 1 and the electrodes can be fully obtained. The base material layer 3 also may have the same level of water holding capacity as the surface layer 5.

The weight swelling ratio in water of the surface layer 5 can be measured by the following procedure. The weight water swelling ratio in water of the electrolyte membrane 1 and that of the base material layer 3 are measured separately. Based on the measured ratios thus obtained and the dimensions of these layers, the weight swelling ratio in water of the surface layer 5 itself can be estimated.

The thickness of the surface layer 5 is not particularly limited, and it may be in the range of 0.3 to 200 μm or of 1 to 50 μm. The excessively thick surface layer 5 could result in an excessively low proton conductivity, although the proton conductivity of the electrolyte membrane depends also on that of the base material layer 3. On the other hand, when the surface layer 5 is excessively thin, the effects of the surface layer 5 on the contact between the electrolyte membrane 1 and the electrodes cannot be expected.

In the present embodiment, both of the surface layer 5 that forms the upper surface (first main surface) of the electrolyte membrane 1 and the surface layer 5 that forms the lower surface (second main surface) thereof have the same composition and the same thickness. The compositions and the thicknesses of this pair of surface layers 5 may be different from each other. This is because the surface layer 5 suitable for the anode and the surface layer 5 suitable for the cathode may need to be fabricated separately in some cases.

<<Fabrication Method of Electrolyte Membrane 1>>

The electrolyte membrane 1 shown in FIG. 1 can be manufactured by the method shown below. First, an electrolyte membrane containing a hydrocarbon-based electrolyte as a main component is prepared. This electrolyte membrane is to be the base material layer 3, and is, for example, a sulfonated polyimide electrolyte membrane. The manufacturing method of the sulfonated polyimide electrolyte membrane is known, and is disclosed in, for example, Non-Patent Literature 2.

Meanwhile, a solution containing: a first polymer having a hydroxyl group; and a second polymer having a proton conductive group is prepared. A solvent in which the electrolyte membrane to constitute the base material layer 3 is insoluble may be used for this solution. Specifically, water is used as the solvent. In this case, the first polymer and the second polymer should be water-soluble. The aqueous solution of the first polymer and the aqueous solution of the second polymer may be prepared separately to mix these aqueous solutions when used.

The content ratio between the first polymer and the second polymer in the solution is not particularly limited. However, when the content of the second polymer having a proton conductive group is too high, the resulting surface layer 5 has poor mechanical strength, or the second polymer exudes easily to the surface layer 5. On the other hand, when the content of the second polymer is too low, the resulting surface layer 5 has poor proton conductivity, which causes the malfunction of the electrolyte membrane 1. In view of these problems, when a PVA is used as the first polymer, the content ratio between the first polymer and the second polymer (first polymer:second polymer) may be in the range of 95:5 to 50:50 in weight ratio.

The molecular weight of the PVA is not particularly limited, but a membrane suitable for an electrolyte membrane can be formed using a PVA having a viscosity-average molecular weight of 10000 to 2000000. A preferable range of viscosity-average molecular weights for the PVA is, for example, from 50000 to 200000.

The concentration of the solution is not particularly limited, but it is usually in the range of 1 to 50% by weight. If the concentration is in the range of 3 to 20% by weight, the surface layer 5 having a uniform thickness can be formed easily.

Next, the solution is applied to the base material. As an application method, dip coating or spray coating can be used. A film with a uniform thickness can be formed on the base material efficiently by using these methods. When the base material is made of a water-insoluble material, dip coating with high production efficiency may be used. The film thus formed on the base material is a precursor film containing the first polymer and the second polymer. In the precursor film, the first polymer has not yet been not cross-linked.

Next, the precursor film formed on the base material is dried. The precursor film may be dried by heating the film. When the first polymer like PVA, whose crystallization proceeds by heat treatment, is used, whether or not the heat treatment is performed during the drying process influences the properties of the surface layer 5. If the crystallization of PVA is allowed to proceed moderately before the cross-linking, the proton conductivity and methanol blocking properties of the surface layer 5 can be improved.

The precursor film can be dried by placing the base material, on which the precursor film is formed, into a heat treatment furnace. The ambient temperature in the heat treatment furnace is not particularly limited as long as it is lower than the melting temperature or the decomposition temperature of the precursor film. When PVA is used as the first polymer; the ambient temperature may be in the range of 100 to 180° C. in which the crystallization of PVA proceeds, and preferably in the range of 120 to 140° C. in which the crystallization of PVA proceeds most efficiently. The duration of the heat treatment is from about several minutes to about 1 hour because PVA crystallizes relatively rapidly, although the duration may depend on the heat treatment temperature.

Next, the step of cross-linking the first polymer is performed. A cross-linking agent having a plurality of functional groups that react with the hydroxyl groups of the first polymer may be used. Specific examples thereof include glutaraldehyde, terephthalaldehyde, and suberoyl chloride.

The cross-linking step can be performed according to a known procedure. For example, the precursor film is immersed in a solution containing the cross-linking agent (cross-linking solution). As a result, the cross-linking reaction of the first polymer proceeds, and thus the surface layer 5 is formed on the base material (base material layer 3). The concentration of the cross-linking solution and the cross-linking time may be adjusted as appropriate depending on the composition of the precursor film and the type of the cross-linking agent. In one example, the concentration of the cross-linking solution is 1 to 20% by weight, and the cross-linking time is 0.1 to 48 hours. The degree of cross-linking varies depending on the concentration of the cross-linking solution and the cross-linking time. Using this variation, the weight swelling ratio in water and the hardness of the surface layer 5 can be controlled.

When the second polymer having a proton conductive group that is in the form of a salt, such as a sodium salt or an ammonium salt, is used, an acid treatment step for protonating the proton conductive group may be performed. The details of the acid treatment step are not particularly limited. For example, after the cross-linking step is performed, the electrolyte membrane may be immersed in a 0.5 to 2 N aqueous hydrochloric acid solution or aqueous sulfuric acid solution for about 1 hour to 24 hours.

By performing the above-described steps, the electrolyte membrane 1 shown in FIG. 1 is obtained.

The electrolyte membrane 1 may also be obtained by fabricating a film as the surface layer 5 using the solution containing the first polymer and the second polymer and laminating this film on the base material. This method is effective when the base material is soluble in the solution.

Furthermore, there is another way than cross-linking to make a polymeric material having a hydroxyl group and a proton conductive group. Specifically, such a polymeric material can be made, for example, by one of the following methods (i), (ii), and (i) copolymerizing a monomer having a proton conductive group with a monomer having a hydroxyl group;

(ii) polymerizing a monomer having a hydroxyl group and a proton conductive group; and (iii) introducing a proton conductive group into a polymer having a hydroxyl group (by substitution or grafting of functional groups).

The polymeric material obtained by any of these methods is formed into a film, and laminated on the base material. Thus, the electrolyte membrane having the structure shown in FIG. 1 can be manufactured. When any of these method is used, neither the first polymer nor the second polymer has to be soluble in water.

Although the applications of the electrolyte membrane of the present invention are not particularly limited, it is suitable for use as a polymer electrolyte membrane (PEM) for PEFCs, particularly suitable for use as a PEM for DMFCs, which use a methanol-containing solution as a fuel.

<<Membrane-Electrode Assembly>>

Figure 2:
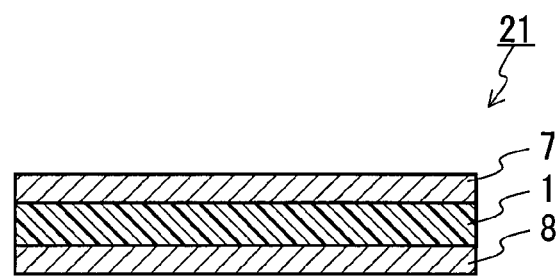
FIG. 2 is a schematic view illustrating one example of a membrane-electrode assembly according to the present invention.

FIG. 2 shows one example of a membrane-electrode assembly (MEA) according to the present invention. A MEA 21 shown in FIG. 2 includes the electrolyte membrane 1 and a pair of electrodes (an anode 7 and a cathode 8) placed to sandwich the electrolyte membrane 1 therebetween. The electrolyte membrane 1 and the anode 7 are joined together. Likewise, the electrolyte membrane 1 and the cathode 8 are joined together. The electrolyte membrane 1 and each of the electrodes are joined together by known techniques such as hot pressing and clamping.

<<Polymer Electrolyte Fuel Cell>>

Figure 3:
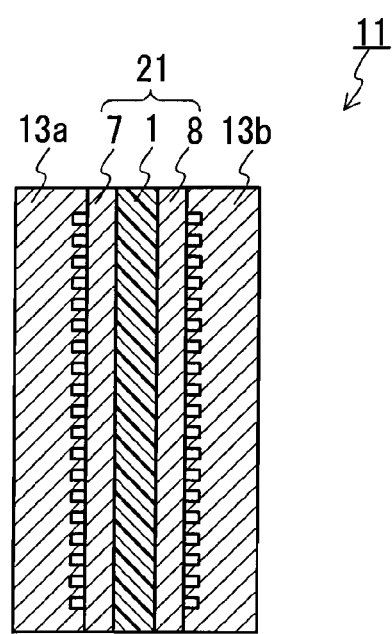
FIG. 3 is a schematic view illustrating one example of a fuel cell according to the present invention.

FIG. 3 shows one example of the polymer electrolyte fuel cell (PEFC) according to the present invention. A fuel cell 11 shown in FIG. 3 includes the MEA 21 and a pair of separators (an anode separator 13*a* and a cathode separator 13*b*) placed to sandwich the MEA 21 therebetween. These components are joined together with pressure applied in the direction perpendicular to the main surface of each of the components.

If the MEA 21 using the electrolyte membrane 1 is incorporated into a PEFC, the aging time of the PEFC can be reduced and the power generation efficiency thereof can be improved. The fuel cell of the present invention may include other components than those shown in FIG. 3, if necessary. Although the PEFC 11 shown in FIG. 3 is a so-called single cell, the fuel cell of the present invention may be a stack of a plurality of such single cells.

EXAMPLES

Hereinafter, the present invention will be described in more detail with reference to the following examples. However, these examples are not intended to limit the scope of the present invention.

Example

First, a sulfonated polyimide electrolyte membrane (containing 4,4'-bis(4-aminophenoxy)biphenyl-3,3'-disulfonic acid (BAPBDS) and 4,4'-bis(4-aminophenoxy)biphenyl (BAPB) at a molar ratio of 4:1) was prepared in the following procedure. 3.17 g of 4,4'-bis(4-aminophenoxy)biphenyl-3,3'-disulfonic acid (BAPBDS), 0.55 g of 4,4'-bis(4-aminophenoxy)biphenyl (BAPB), 15 ml of m-cresol, and 1.7 ml of triethylamine were charged into a 100 ml four-necked flask, and the mixture was stirred at 80° C. under a nitrogen stream to dissolve the materials in m-cresol. Next, 2.01 g of 1,4,5,8-naphthalene tetracarboxylic dianhydride (NTDA) and 1.73 g of benzoic acid were added to the solution, and the mixture was stirred continuously under a nitrogen stream at 180° C. for 20 hours. Thus, polymerization was carried out. After the reaction was completed, 10 ml of m-cresol was added to dilute the polymerization solution. The diluted solution was added dropwise to acetone to precipitate a solid. The solid was filtered off and dried. The obtained product was dissolved in m-cresol to obtain a 6.5% by weight solution. Thus, a coating liquid was prepared. This coating liquid was applied to a glass substrate, and dried at 120° C. for 12 hours. After drying, the resulting membrane was subjected to proton exchange treatment by being immersed in a 1.0 mol/ml aqueous sulfuric acid solution at room temperature for 24 hours. The resulting membrane was washed with pure water, and then vacuum-dried at 150° C. for 12 hours. Thus, a sulfonated polyimide electrolyte membrane was obtained.

Next, a 5% by weight aqueous solution of a PVA (with a degree of polymerization of 3500) and a 5% by weight aqueous solution of sodium polystyrene sulfonate (PSSNa, with a weight-average molecular weight of 1000000) were mixed at a polymer weight ratio of 70:30 (PVA:PSSNa). Then, the mixed solution was stirred until homogeneous. The sulfonated polyimide electrolyte membrane was immersed in this mixed solution. The dimensions of the sulfonated polyimide electrolyte membrane were 10 cm long, 10 cm wide, and 40 μm thick. The membrane was taken out of the mixed solution, and then dried at 60° C. Furthermore, the membrane was immersed again, and then dried at room temperature for 24 hours. A precursor film containing PVA and PSSNa was formed on the sulfonated polyimide electrolyte membrane in the manner described above.

Next, the membrane thus obtained was immersed in a cross-linking solution at room temperature for 4 hours to perform a cross-linking reaction. As the cross-linking solution, an acetone solution containing 18% by weight of glutaraldehyde and 0.01% by weight of sulfuric acid was used. After the cross-linking reaction was completed, the membrane was washed with pure water, and further immersed in a 0.5 mol/L aqueous sulfuric acid solution at 60° C. for 6 hours. As a result, sodium polystyrene sulfonate (PSSNa) was converted into polystyrene sulfonic acid (PSSA). Finally, the membrane was washed with pure water, and vacuum-dried at room temperature for 24 hours. The electrolyte membrane of the example was obtained in the manner described above. The surface layer of this electrolyte membrane had a thickness of 7 μm.

On the other hand, a film made of PVA and PSSNa and having a thickness of 30 μm was fabricated using the above-mentioned mixed solution. This film was subjected to cross-linking treatment under the same conditions as those for the electrolyte membrane of the example. This film is identical to the surface layer of the electrolyte membrane of the example. The weight swelling ratio in water of the film thus obtained was 64%. The weight swelling ratio in water of the sulfonated polyimide electrolyte membrane used as the base material was 87%.

Next, a power generation test was performed using the electrolyte membrane of the example. Specifically, the electrolyte membrane was immersed in water, and then a power generation test was performed using a passive DMFC. As an anode and a cathode, gas diffusion electrodes were used. In each of the gas diffusion electrodes, a catalyst layer made of a supported platinum catalyst (TEC66E50 for the anode, and TEC10E50E for the cathode, both manufactured by Tanaka Kikinzoku) and a perfluorocarbon sulfonic acid (Nafion DE-520, manufactured by DuPont) was formed on a carbon paper (TGP-H-060, manufactured by Toray Industries, Inc.). The anode, the electrolyte membrane, and the cathode were stacked on one another, and pressure was applied on them by means of plates placed on both sides of the DMFC. Thus, the anode, the electrolyte membrane, and the cathode were joined together by clamping. As a fuel, a 3 mol/L aqueous methanol solution was used. The cathode was exposed to air. A propeller directly coupled to a motor was used as a load.

40 minutes after the fuel supply, the propeller started rotating. Then, the propeller continued to rotate until the fuel supply was stopped. The output voltage and current under load were 0.3 V and 24 to 25 mA, respectively.

Comparative Example

The sulfonated polyimide electrolyte membrane used as the base material in the example was prepared as an electrolyte membrane (of 10 cm long, 10 cm wide, and 40 μm thick) as a comparative example. As described above, the weight swelling ratio in water of the sulfonated polyimide electrolyte membrane was 87%. Next, for the electrolyte membrane of the comparative example, a power generation test was performed using a DMFC under the same conditions as those for the example. As a result, 20 hours after the fuel supply, a propeller started to rotate, but stopped 5 seconds later. The output voltage under load was 0.08 V.

As described above, as a result of forming the surface layer 5 on the sulfonated polyimide electrolyte membrane (base material layer 3), the time it took for the DMFC to generate power was reduced and the power generation properties were improved.

The invention claimed is:

1. An electrolyte membrane for a polymer electrolyte fuel cell, the electrolyte membrane comprising:
   a base material layer comprising a hydrocarbon-based electrolyte as a main component; and
   a surface layer that is laminated with the base material layer and comprises a polymeric material as a main component,
   wherein the polymeric material comprises a first polymer having a hydroxyl group; and a second polymer having a sulfonic acid group or a phosphoric acid group,
   the first polymer is at least one resin selected from the group consisting of polyvinyl alcohol and an ethylene-vinyl alcohol copolymer,
   the second polymer is at least one material selected from the group consisting of polystyrene sulfonic acid, polyvinyl sulfonic acid, poly-2-acrylamido-2-methylpropane sulfonic acid, water-soluble sulfonated poly(ether ether ketone), and water-soluble sulfonated poly(ether sulfone),
   molecules of the first polymer are cross-linked and form a matrix,
   the matrix has a cross-linked structure that is water-insoluble and is formed between the molecules of the first polymer,
   the cross-linked structure is derived from a cross-linking agent,
   and
   the second polymer is held in the matrix.

2. The electrolyte membrane for a polymer electrolyte fuel cell according to claim 1,
   wherein one surface layer is formed on an upper surface of the base material layer and another surface layer is formed on a lower surface of the base material layer, so that the surface layers sandwich the base material layer therebetween.

3. The electrolyte membrane for a polymer electrolyte fuel cell according to claim 1, wherein the hydrocarbon-based electrolyte in the base material layer is sulfonated polyimide or sulfonated polyarylene.

4. A membrane-electrode assembly, comprising:
an electrolyte membrane according to claim 1; and
a pair of electrodes placed so as to sandwich the electrolyte membrane between the electrodes.

5. A fuel cell having a membrane-electrode assembly according to claim 4 as a power generating component.

6. A method of manufacturing an electrolyte membrane for a polymer electrolyte fuel cell, the method comprising steps of:
preparing a base material comprising a hydrocarbon-based electrolyte as a main component;
preparing a solution comprising: a first polymer having a hydroxyl group; and a second polymer having a sulfonic acid group or a phosphoric acid group; and
forming a surface layer on the base material using the solution, so that the surface layer comprises, as a main component, a polymeric material comprising the first polymer and the second polymer,
wherein the first polymer is at least one resin selected from the group consisting of polyvinyl alcohol and an ethylene-vinyl alcohol copolymer,
the second polymer is at least one material selected from the group consisting of polystyrene sulfonic acid, polyvinyl sulfonic acid, poly-2-acrylamido-2-methylpropane sulfonic acid, water-soluble sulfonated poly(ether ether ketone), and water-soluble sulfonated poly(ether sulfone),
a cross-linking agent is used so that the molecules of the first polymer in the step of forming the surface layer cross-link, and
the second polymer is held in a water-insoluble matrix of the cross-linked molecules of the first polymer.

7. The method of manufacturing an electrolyte membrane for a polymer electrolyte fuel cell according to claim 6, wherein
the solution is an aqueous solution of the first polymer and the second polymer, and
the step of forming the surface layer comprises steps of:
applying the aqueous solution to the base material; and
cross-linking molecules of the first polymer on the base material.

8. The electrolyte membrane for a polymer electrolyte fuel cell according to claim 1, wherein the cross-linking agent has a plurality of functional groups that react with the hydroxyl groups of the first polymer.

9. The electrolyte membrane for a polymer electrolyte fuel cell according to claim 1, wherein the cross-linking agent is at least one material selected from the group consisting of glutaraldehyde, terephthalaldehyde, and suberoyl chloride.

10. The method of manufacturing an electrolyte membrane for a polymer electrolyte fuel cell according to claim 6, wherein the cross-linking agent has a plurality of functional groups that react with the hydroxyl groups of the first polymer.

11. The method of manufacturing an electrolyte membrane for a polymer electrolyte fuel cell according to claim 6, wherein the cross-linking agent is at least one material selected from the group consisting of glutaraldehyde, terephthalaldehyde, and suberoyl chloride.

* * * * *